United States Patent
Towner et al.

(10) Patent No.: US 6,536,907 B1
(45) Date of Patent: Mar. 25, 2003

(54) ABERRATION COMPENSATION IN IMAGE PROJECTION DISPLAYS

(75) Inventors: David K. Towner, Boise, ID (US); Mark Butterworth, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/499,707

(22) Filed: Feb. 8, 2000

(51) Int. Cl.[7] ............ G03B 21/00; G03B 21/14; G03B 13/24; H04N 3/26; G02F 1/00
(52) U.S. Cl. .......... 353/121; 353/69; 353/70; 348/745; 348/746; 348/747; 348/771; 396/115; 396/149; 396/150
(58) Field of Search ............... 348/745, 746, 348/747, 771, 806; 353/69, 70, 121; 396/115, 149, 150, 430

(56) References Cited

U.S. PATENT DOCUMENTS

| | | | | |
|---|---|---|---|---|
| 5,557,353 A | * | 9/1996 | Stahl | 353/69 |
| 5,675,380 A | * | 10/1997 | Florent et al. | 348/251 |
| 6,078,371 A | * | 6/2000 | Ichikawa et al. | 349/95 |
| 6,175,357 B1 | * | 1/2001 | Gordon | 345/158 |
| 6,179,424 B1 | * | 1/2001 | Sawamura | 353/33 |
| 6,185,006 B1 | * | 2/2001 | Yoshida | 358/1.9 |
| 6,201,642 B1 | * | 3/2001 | Bos | 359/565 |
| 6,222,676 B1 | * | 4/2001 | Togino et al. | 359/630 |
| 6,252,218 B1 | * | 6/2001 | Chou | 250/208.1 |
| 6,354,707 B1 | * | 3/2002 | Jeon et al. | 353/69 |

OTHER PUBLICATIONS

"Projection Displays", by Edward H. Stupp and Matthew S. Brennesholtz, pp. 3–9, Wiley & Sons, 1999.

* cited by examiner

*Primary Examiner*—Russell Adams
*Assistant Examiner*—Melissa J Koval

(57) ABSTRACT

Optical projection systems for the display of electronic images often suffer from degraded image quality due to color field registration errors caused by lateral chromatic aberration. Although most projection lenses are partially corrected for lateral chromatic aberration during the design process, the uncorrected residual aberration limits the imaging performance of many projection displays, especially when displaying text and graphics with single-pixel-wide features. Some embodiments of the invention correct color field registration errors due to lateral chromatic aberration in multiple-imager projection systems. Other embodiments of the invention correct radial distortion and keystone distortion in single-imager and multiple-imager projection displays. In some embodiments of the invention, the imager(s) pixel geometry is arranged to compensate for optical aberrations, which result from the optical system so as to achieve a corrected image.

20 Claims, 4 Drawing Sheets

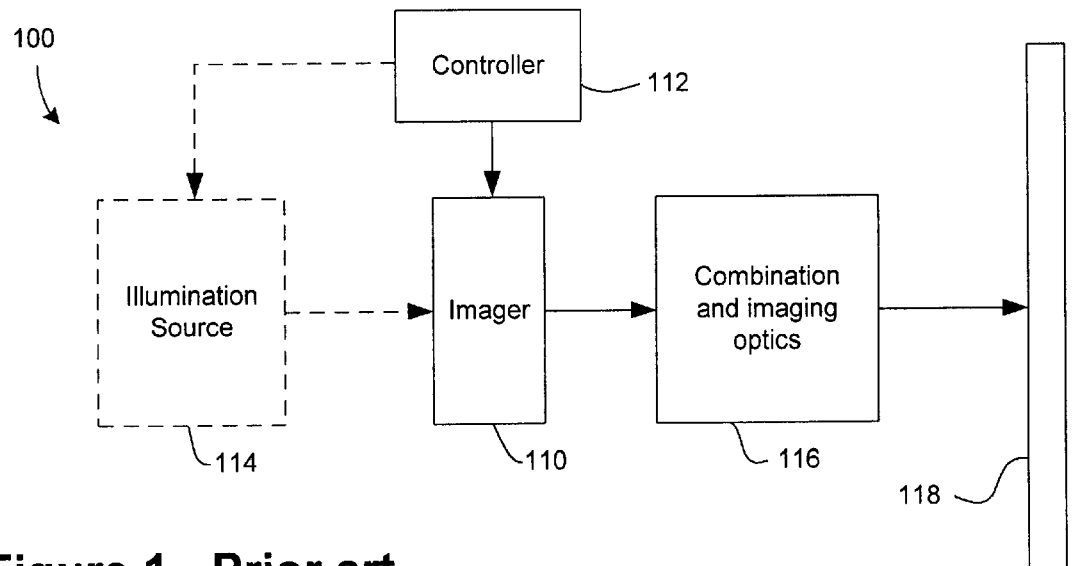
Figure 1 - Prior art
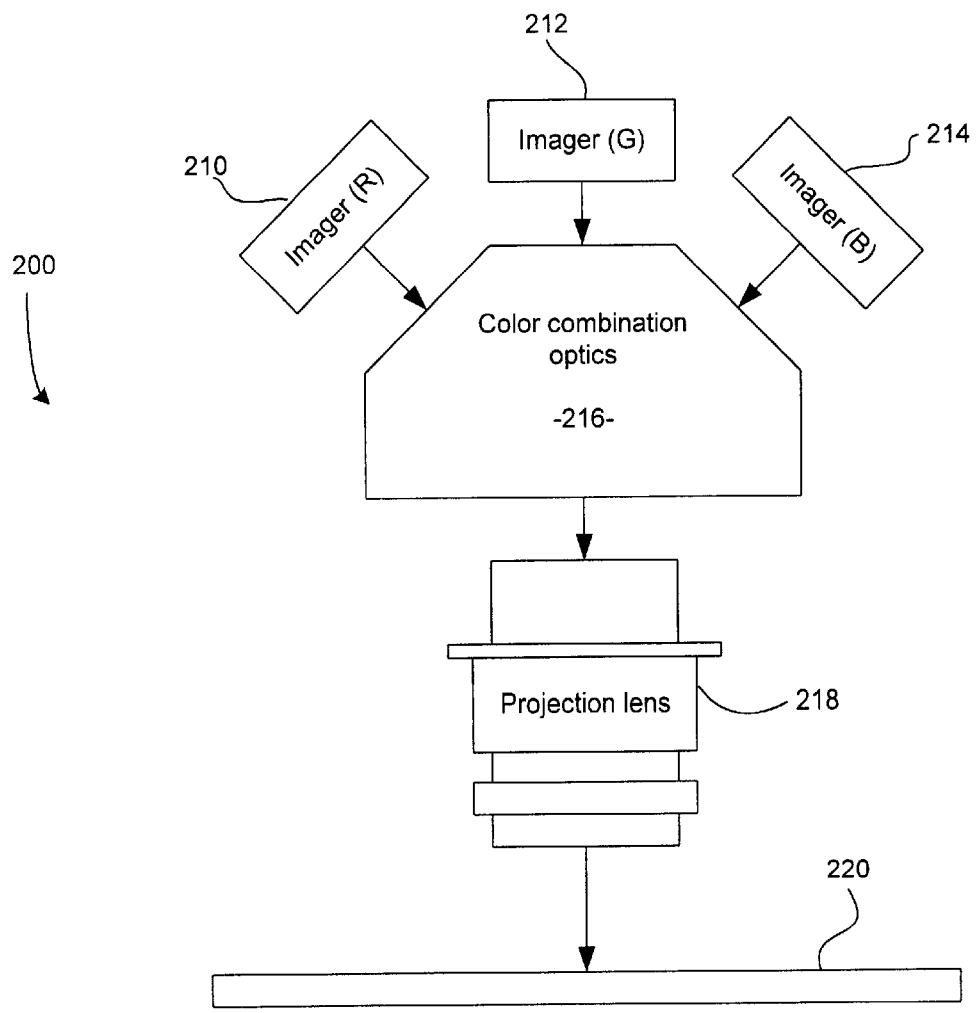
Figure 2 - Prior art

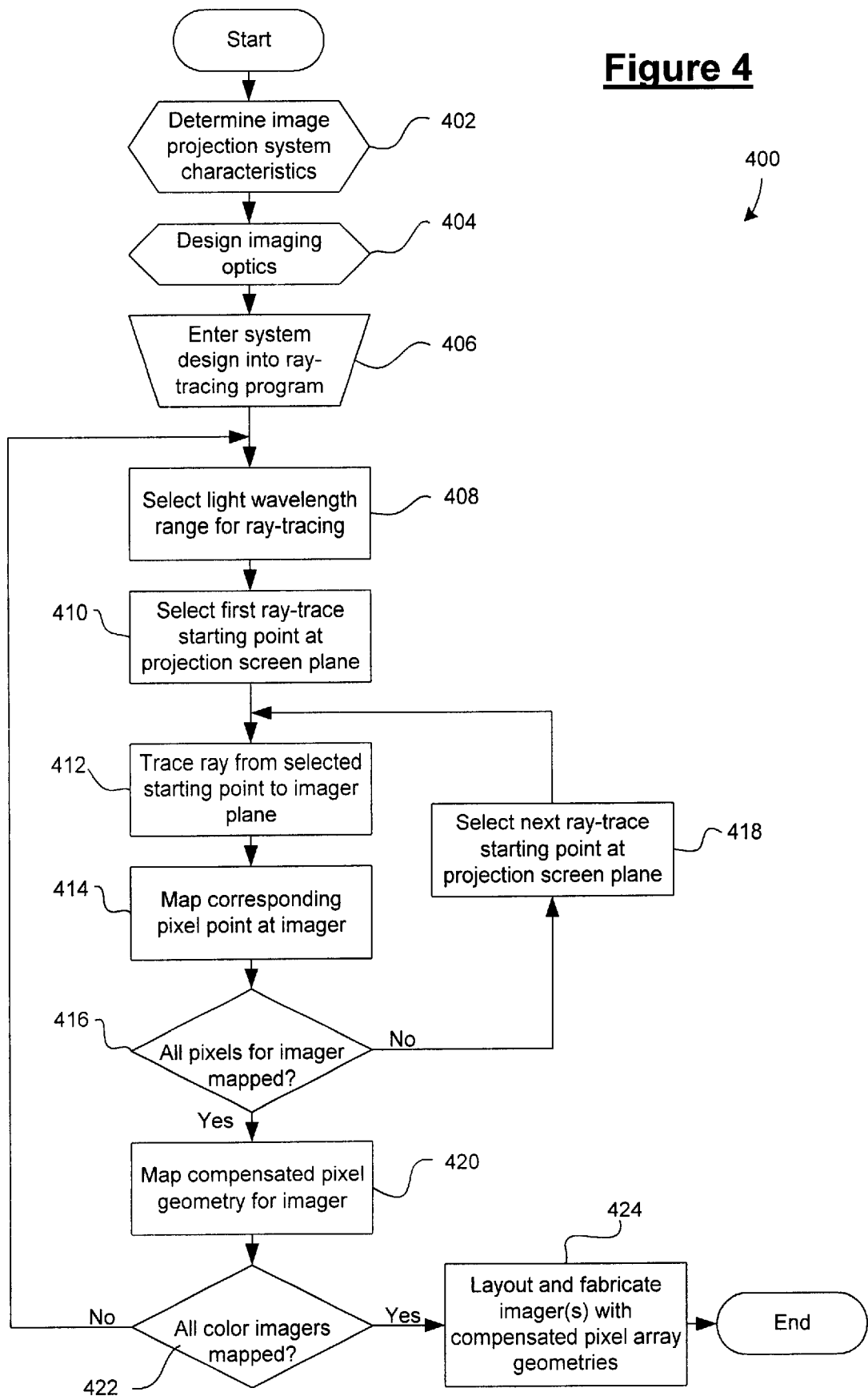

Red imager pixel mapping

Green imager pixel mapping

Blue imager pixel mapping

ABERRATION COMPENSATION IN IMAGE PROJECTION DISPLAYS

FIELD OF THE INVENTION

The present invention relates to the field of aberration compensation in image projection for electronic image display or image sensing. The invention is applicable, for example, to optical projection displays used for viewing electronically produced and electronically reproduced images, graphics and text, including video and television images. In particular, embodiments of the invention relate to the arrangement of imager geometries for compensating projection lens aberrations in projection displays. Applications for optical projection systems include computer monitors and televisions.

BACKGROUND OF THE INVENTION

In a typical optical projection display, images are produced by an image-forming device (sometimes referred to as an "imager") having electronically addressable picture elements. A picture element, or pixel, is the smallest independently addressable area of the imager, and is the "unit cell" from which images are constructed. Pixels are most commonly aligned in horizontal rows and vertical columns, but other geometries are sometimes used. Imagers may comprise, for example, liquid crystal cells, tilting micromirrors, light emitting diodes, lasers, or other devices which produce, modulate, direct, alter polarization, or otherwise modify light. Imagers may be illuminated by an external source of light such as an arc lamp, a light emitting diode (LED) or a laser source. Illuminated imagers may be reflective or transmissive. Imagers may also be self-luminous, comprising arrays of LED's, lasers or the like. Color display systems may include three separate imagers producing three different colored sub-images in the image to be displayed, for example producing red, green and blue sub-images which combine to form the complete image in an RGB color additive system. Optical projection displays also comprise imaging optics which collect light leaving the imager and form a magnified image on a viewing screen. The imaging optics normally include a projection lens, and may also contain a light source, illuminator optics, beamsplitters, filters, polarizers, retardation plates, mirrors and the like.

In prior art optical projection systems, an imager is normally constructed with an ideal pixel geometry. The ideal pixel geometry is geometrically similar to the ideal screen geometry, where the ideal screen geometry is the desired geometry of the projected image on the viewing screen. Geometric similarity means that all dimensions on the ideal screen geometry are in a constant ratio to their corresponding dimensions on the ideal pixel geometry, that ratio being the magnification of the projection optics. An example of an ideal pixel geometry is a uniform rectangular grid of identical rectangular pixels. An imager with an ideal pixel geometry would produce an image with an ideal screen geometry if aberration-free imaging optics could be used. In practice, real imaging optics have aberrations which cause geometric errors in the projected image. Thus, an imager with an ideal pixel geometry does not generally produce an image with an ideal screen geometry.

In prior art systems, optical designers have attempted to design nearly-aberration-free imaging optics which produce images with nearly-ideal screen geometries when used with imagers having ideal pixel geometries. For many prior art optical projection display designs, this has been an exceedingly difficult or unachievable task. Previous attempts to solve aberration problems have concentrated on designing increasingly complex projection lenses, for example comprising expensive low-dispersion glass types. In particular, the difficulty of designing imaging optics with sufficiently small lateral chromatic aberration has increased the design cost and reduced the image quality of many existing optical projection display designs. This problem has also limited the designer's ability to create new designs with wider screens, smaller enclosures, sharper images, lower cost, and other desirable features.

Aberrations in the imaging optics which cause significant geometric errors in the projected image may include lateral chromatic aberration, radial distortion and keystone distortion, each of which is discussed briefly below.

Lateral Chromatic Aberration

In an imaging system, lateral chromatic aberration is the variation of magnification with wavelength, where magnification is the ratio of an image dimension to a corresponding object dimension. In a properly aligned optical projection display, the red, green and blue (RGB) sub-images will coincide at the optical axis. Lateral chromatic aberration in the imaging optics causes registration errors between the RGB sub-images that increase from zero at the projection lens axis to a maximum at or near the corners of the image. Although the optical designer attempts to minimize lateral chromatic aberration when designing the imaging optics, an uncorrected residual aberration invariably remains. The design target for the maximum allowable RGB sub-image registration error in high quality displays may be ¼ pixel or less at the corners of the projected image. However, the registration error between the RGB sub-images due to chromatic aberration is commonly larger than the pixel size, even in "best effort" designs. Thus, the desired level of lateral chromatic aberration correction may not be achievable in the design of imaging optics having acceptably low cost and complexity. The inability to control lateral chromatic aberration often limits the image quality attainable in optical projection displays.

Radial Distortion

Third-order distortion causes a displacement of image points toward or away from the optical axis by an amount proportional to the cube of the distance from the optical axis. Positive third-order distortion causes a square object to form a pincushion-shaped image. Negative third-order distortion causes barrel-shaped images. Fifth-order distortion is similar, except it has a fifth-power dependence on distance from the optical axis. Third, fifth, and higher order distortion are collectively referred to as radial distortion. It is not always practical to eliminate radial distortion in the design of the imaging optics.

Keystone Distortion

Keystone distortion occurs when the imager and the viewing screen are tilted with respect to the optical axis of the imaging optics. As its name implies, keystone distortion causes rectangular objects to produce trapezoidal images. In compact optical projection display designs, it may be desirable to project the image onto a tilted viewing screen using the Scheimpflug condition to ensure a well-focused image. Since keystone distortion lacks rotational symmetry, it is not normally correctable in the design of the imaging optics.

SUMMARY OF THE INVENTION

In accordance with the principles of the present invention, there is provided an optical imaging system having an imager arranged to project or receive imaging light through imaging optics having at least one lens or concave mirror. The imager is constructed to include an array of pixels in which the pixel geometry is arranged to compensate for aberration in the optical system to thereby provide corrected imaging.

The optical imaging system may be in the form of a projection display system, or may be an image acquisition system such as a digital camera or the like.

The optical imaging system can include a plurality of imagers which project or receive light of respective different colors through the same imaging optics.

In one form of the invention the pixel geometries of the imagers are arranged differently to compensate for lateral chromatic aberration. Further, the pixel geometry of each of the imagers can be arranged to compensate for radial distortion and/or keystone distortion aberrations.

In order to produce color images, the optical imaging system may include a plurality of imagers, wherein a first imager produces a first image field in a first wavelength range and a second imager produces a second image field in a second wavelength range. Preferably the first imager has a different pixel geometry than the second imager. The optical imaging system may further include a third imager which produces a third image field in a third wavelength range, the third imager preferably having the same pixel geometry as the first imager.

The present invention also provides a pixelated imager having a two dimensional array of controllable light producing, modifying or sensing picture elements, wherein the array has a non-uniform geometry with the picture elements arranged to compensate for optical aberrations of associated imaging optics. In a particular form of the invention, the spacing of pixels in the picture element array comprises a variable number of photolithographic grid spacings.

In accordance with the present invention there is also provided a method for producing an imager for an image forming or image acquisition system which projects or receives imaging light through imaging optics. The method includes selecting an optical imaging system configuration for use with an imager, and designing the imaging optics for use with the imager in the selected configuration. The method also includes selecting a set of start points, and mapping a set of end points corresponding to the start points projected through the imaging optics. A pixel geometry is designed for the imager using the mapping of the start points to the end points, and an imager is produced having the designed pixel geometry. The imager having the thus designed pixel geometry has pixels placed so as to compensate for aberrations in the imaging optics.

Preferably the mapping of the end points from the start points is accomplished by computerized ray tracing.

Where the optical imaging system configuration is an image projection display having a projection screen, the selected set of start points preferably correspond to a set of points on the projection screen. Preferably the set of end points correspond to a set of points in the plane of the imager in use in the selected optical imaging system configuration.

BRIEF DESCRIPTION OF THE DRAWINGS

The invention is described in greater detail hereinafter, by way of example only, through description of a preferred embodiment thereof and with reference to the accompanying drawings in which:

FIG. 1 is a generalized block diagram of an exemplary image projection display system;

FIG. 2 is a generalized block diagram of a multiple imager projection system;

FIG. 4 is a flowchart diagram of a procedure according to a preferred embodiment of the invention.

DETAILED DESCRIPTION OF THE PREFERRED EMBODIMENT

Figure 3A:
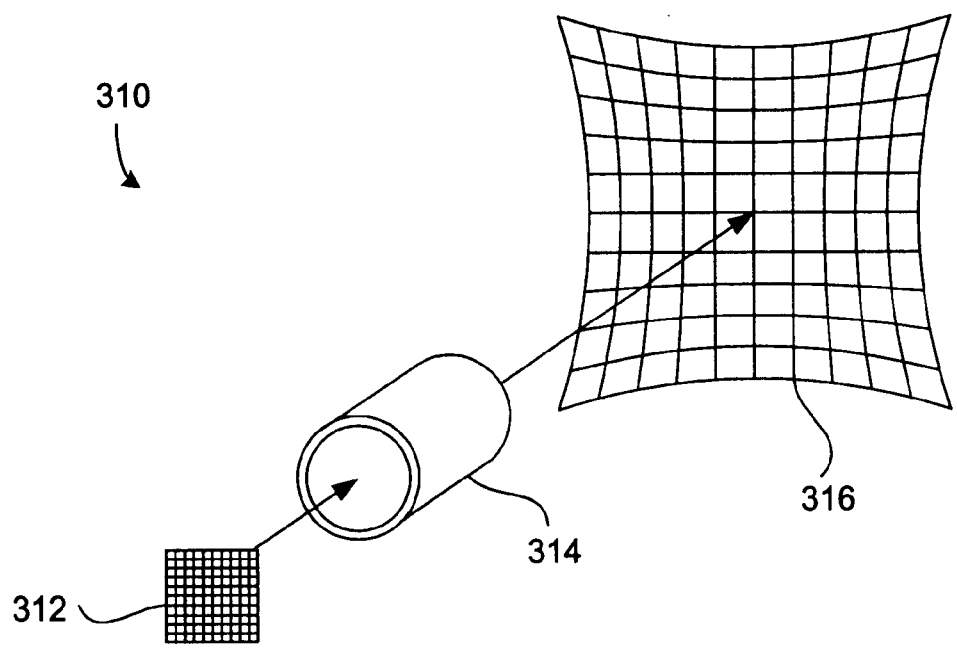
FIGS. 3a and 3b are diagrammatic representations illustrating the principles of the present invention for correcting geometric errors caused by aberrations in the imaging optics between imager and screen.

A method and apparatus for aberration compensation in image projection displays is disclosed herein. In the following description, for purposes of explanation, specific nomenclature and specific implementation details are set forth to provide a thorough understanding of the present invention. However, it will be apparent to one skilled in the art that these specific details are not required in order to practice the present invention. For example, the preferred embodiment is described in the context of an optical image projection display system, but the techniques of the invention are equally applicable to optical image acquisition systems, such as digital cameras and the like. Also, several specific items of equipment from certain suppliers are indicated as being suitable for use in implementing the present invention, but those of ordinary skill in the art will recognize that other items of equivalent or similar function from the same or other suppliers could alternatively be employed.

The present invention enables the solution of a number of optical design problems caused by imaging optics by using imagers with compensated pixel geometries rather than ideal pixel geometries. Imagers with calculated compensated pixel geometries can produce images with nearly-ideal screen geometries when projected through aberrated imaging optics having lateral chromatic aberration, radial distortion, keystone distortion, and the like. These aberrations, and certain others, cause systematic errors in the location of image points in an image plane, but do not alter the sharpness of the image. While it may not be practical, or even possible, to design aberration-free imaging optics, the embodiments of the present invention can be used to facilitate removal of the effects of certain aberrations from the projected or acquired image.

General Structure of Image Projection Displays

A generalized block diagram of an image projection display system 100 is shown in FIG. 1. The system 100 has an imager 110 which comprises a liquid crystal cell, tilting micromirrors, light emitting diodes, lasers, or other devices which produce, modulate, direct, alter polarization, or otherwise modify light in a controllable way. The imager 110 can be of a self-luminous, light transmissive or light reflective type. For transmissive and reflective imagers a separate illumination source (114) is required. The imager 110 is controllable by a controller 112, such as computer or television circuitry. For a color display the imager 110 may in fact comprise a plurality of separate image-forming devices, for example one for each of three colors in the case of an RGB display. A color display may alternatively have only a single image-forming device which is time-shared among the additive colors, sometimes referred to as a sequential color imager. In that case the illuminator 114 might be controlled by the controller in conjunction with the imager to coordinate color sequencing in order to form color images. For the purposes of the present explanation, the imager 110 can be considered as three liquid crystal (transmissive) light valves, each controlled to produce a respective red, green and blue sub-image. In that case the illuminator 114 would present polarized light as input to the imager, and the light would pass through the three liquid crystal light valves to reach the projection screen. Either the illuminator or the imager would include color separation beam-splitters, so that the input light presented to each of the light valves is of the correct color (e,g, only red light is passed through the "red" liquid crystal light valve).

The light which is output from the imager 110 is passed to recombination and imaging optics 116. The recombination and imaging optics 116 combine the color sub-images (using dichoric beam-splitters or the like), and magnify the combined image for projection onto a screen 118. As mentioned above, the imaging optics can introduce aberrations, some of which are very difficult and expensive to satisfactorily overcome using prior art optical design techniques. The imaging optics are typically designed in an application-specific manner. For example, the imaging optics for a rear-projection computer monitor will normally be different from those designed for a front projection television system, although the imager(s) employed in both might be the same. The present invention, on the other hand, considers the imager 110, imaging optics 116 and projection screen 118 as a whole. This allows embodiments of the present invention to facilitate compensation at the imager 110 for optical aberrations which are introduced by the imaging optics 116 so as to present the best image at the projection screen 118.

For the purposes of illustration, a simple three color (RGB) image projection display system 200 is shown in block diagram form in FIG. 2. Three imagers 210, 212, 214 generate respective red, green and blue sub-images. For the purposes of simplified explanation, consider the imagers 210, 212 and 214 to be self-luminous, such as colored LED pixel arrays or the like, in order to avoid the complication of illumination optics. The sub-image light from the three imagers is input to color combination optics 216 comprising, for example, dichroic beam-splitters. The color combination optics 216 function to combine the light from the three sub-images into a single image which is provided at the color combination optics output. The combined image light is passed from the output of the color combination optics to the projection lens 218, which is provided for the purpose of forming a magnified image for display on the screen 220. The projection lens 218 in most instances will actually comprise a series of lens elements, the configuration of which will be highly application specific. For example, the imaging optics for a projection display in which the half-field angle is 15 degrees will be different than for an application where the half-field angle is 30 degrees. An introduction to the design considerations for the overall optical system, as well as the various other components of known projection displays, are described in *Projection Displays* (Edward H. Stupp and Matthew S. Brennesholtz; published by John Wiley & Sons, 1999). As discussed above, optical aberrations are often introduced by the imaging optics, depending upon the configuration, and even careful design of the projection optics cannot always yield a projected image of satisfactory quality at an acceptable price.

Imager Pixel Geometry for Aberration Compensation

The present invention addresses the difficulty of aberrations introduced by the imaging optics by considering the imager, imaging optics and projection screen as a whole, and compensating for the aberrations of the imaging optics with the structure of the imager itself. FIG. 3a illustrates in a simplified manner the difficulty of aberrations introduced by imaging optics in a prior art. In FIG. 3a there is shown an image projection system 310 comprising an imager 312, imaging optics in the form of a projection lens 314 and a screen 316. A uniform square array pattern shown on the imager 312 represents an ideal pixel geometry. Light from the imager passes through the projection lens 314 forming a magnified projected image on the screen 316. However, aberrations introduced by the projection lens can result in distortion of the projected image on the screen, as indicated by the distorted pattern represented on the screen 316 in the figure. The distorted pattern shown in FIG. 3a illustrates the "pincushion" shape characteristic of one type of radial distortion, but is not intended to actually represent a realistic aberration pattern and is shown for illustrative purposes only.

Figure 3B:
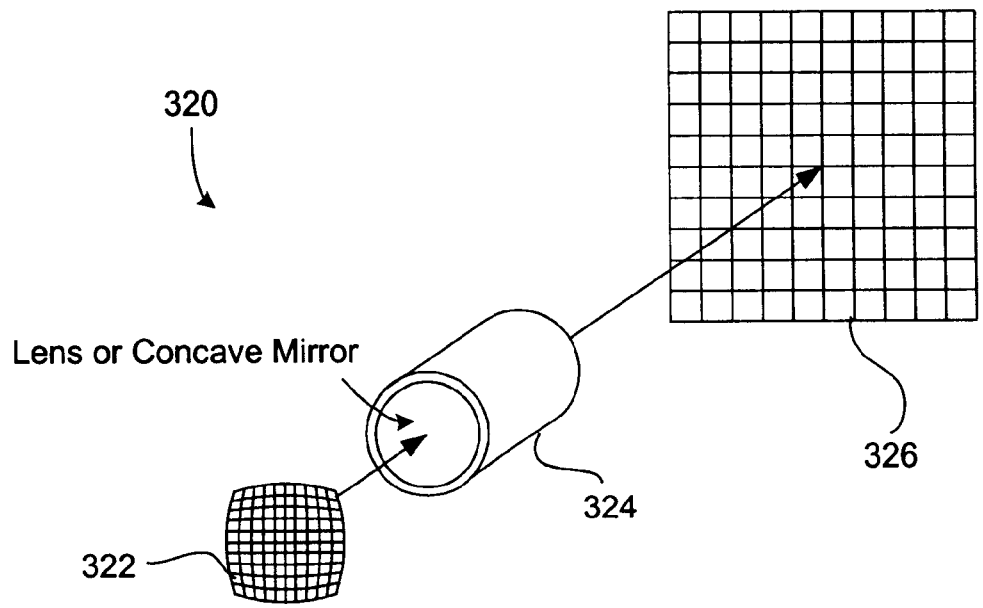

FIG. 3b illustrates, in a simplified way, the mode of operation of the present invention in compensating for aberrations in the imaging optics. In this figure there is also shown an image projection system 320, which has an imager 322, a projection lens 324 and a screen 326. In this case, however, the pixel geometry of the imager 322 is not "ideal". Instead the imager pixel geometry is arranged in a calculated way, as represented by the distorted grid pattern shown in the figure, so that the image which is presented on the screen 326 is ideal after passing through the projection lens 324.

The deterministic nature of optical aberrations and their predictable effects on image geometry allows geometric image errors to be predictably removed using inherently accurate and highly-controllable photolithographic processes to build imagers having compensated pixel geometries. The correction of lateral chromatic aberration in a three-imager RGB system, for example, may require the RGB sub-images to be registered over the entire image area with an accuracy of a small fraction of a pixel. This requires the ability to produce compensated pixel geometries which are accurate to a small fraction of a pixel over the entire imager, and also requires the ability to produce imagers having geometries which are consistent from part to part to a small fraction of a pixel. These requirements for long-range geometric fidelity and process consistency are readily met by current photolithographic processes.

Correctable Aberrations in Single and Multiple Imager Systems

In a single-imager color sequential display, geometric errors which are common to all color sub-images can be corrected through application of the present invention. For example, projection optics with radial distortion of the pincushion type, when used with an imager having a compensated pixel geometry with the correct amount of barrel distortion will produce a projected image which is substantially free from radial distortion. In a multiple-imager display, geometric errors such as lateral chromatic aberration, which are generally different in each sub-image, can be corrected by embodiments of the invention, in addition to errors such as radial distortion which are common to all sub-images. Embodiments of the invention also provide means to correct keystone distortion in projected images when the optical axis of the imaging optics is not perpendicular to the viewing screen. In such cases, the present invention enables the keystone distortion to be substantially eliminated from the projected image in single-imager and multiple-imager systems.

Methods for Determining Compensated Pixel Geometries

One method for determining a compensated pixel geometry utilizes a computer to trace ray paths through the imaging optics. Alternatively, the screen geometry produced by prototype imaging optics in combination with imagers having a known pixel geometry, can be measured directly and a compensated pixel geometry can be calculated from those measurements. A third method derives the compensated pixel geometry from aberration coefficients which are calculable for some imaging optics without the need for ray tracing.

Determining a Compensated Pixel Geometry by Computer Ray-Tracing

The preferred method for determining a compensated pixel geometry for an imager is to use a computer ray tracing program to trace rays backwards through the optical system. As is well known in the art, optical ray paths are reversible and can be traced forward or backward with identical results. Commercial optical ray tracing programs are readily available, well suited to this task, and capable of producing results with sub-micron accuracy. To use this method, an ideal screen geometry having the size and pixel geometry desired in the projected image, is defined as the object for ray tracing purposes. In setting up the ray-trace, the ideal screen geometry is located in an object plane at the diffusing layer in the viewing screen. Rays paths are then traced from selected reference points in this object plane, through the imaging optics, to an image plane located at an active layer in the imager. Each reference point in the ideal screen geometry is thus mapped to a corresponding reference point in the imager, thus defining the compensated pixel geometry. By choosing the number and placement of the reference points used for ray-tracing, the designer can define the compensated pixel geometry with arbitrarily high spatial resolution. In a real system, an imager having a compensated pixel geometry determined in this manner can be expected to produce an image having a nearly-ideal screen geometry.

For projection systems with multiple-imagers, this ray-tracing process is repeated for each additional imager When lateral chromatic aberration is present in the projection optics, the compensated pixel geometries determined for each color channel will generally differ in size. This occurs because the magnification of the projection optics varies with wavelength. In a preferred embodiment of this invention, the imaging optics are designed to be achromatic for two color channels. Two color channels which are achromatic have the same magnification, and are able to use the same compensated pixel geometry. In an RGB system, one of these achromatic color channels could be chosen to be the red and the other blue, allowing the red and blue color channels to use identical imagers with identical compensated pixel geometries. In this example, the green imager would generally have a different compensated pixel geometry with a different image size to allow compensation of the residual lateral chromatic aberration. Achromatizing the imaging optics to reduce the number of unique imager geometries results in a potential cost savings compared to systems which are not achromatized.

FIG. 4 is a flowchart diagram of an analysis and design procedure 400 in accordance with a preferred embodiment of the present invention in which imagers having compensated pixel geometries for an image projection display are produced. To begin with in procedure 400, it is necessary to determine the desired characteristics of the image projection system at 402. As mentioned above, the present invention considers the imager as part of a system including the imaging optics. The desired characteristics of the image projection system which would be determined at step 402 include the desired image size at the screen, the distance from the projection optics to the screen, the projection angle, the nominal imager properties, and space constraints which will affect the design of the imaging optics. This step is part of the ordinary design procedure for an image projection display system. Selecting the nominal imager properties can include selecting a template imager design having the general characteristics desired, such as addressability (e.g. number of pixels in each dimension of the pixel array) and array size, which can be customized with a compensated pixel layout and then fabricated.

Once the general system characteristics have been determined it is necessary to design the imaging optics to suit the system (404). This step is also part of the ordinary design process for image projection displays, although the imaging optics for use in embodiments of the present invention may not require the complexity needed by projection systems of the prior art to minimize optical aberrations. The projection optics in a color projection system would include the optical components which may be required for combining separate color sub-images. Once the optical projection arrangement has been designed for the system under consideration, the optical system design parameters are entered into a suitable ray-tracing computer software program such as OSLO, Code V, or Zemax at step 406. The parameters required for accurate ray-tracing will include such things as the radius of curvature, thickness and refractive index data for each optical element, as is known by those skilled in the art of optical ray-tracing. With the optical design emulated by the ray-tracing program it is then possible to accurately trace virtual light rays through the projection optics between the screen and the imager(s).

Using the ray-tracing software, a set of ray-trace starting points are selected at the plane of the screen diffusing layer. For example, the set of selected points might correspond to the center points of an ideal pixel geometry which is desired at the display screen. For a multiple color sub-image system which uses separate imagers for different colors, the particular light wavelength distribution which is used for each imager must also be simulated in the ray-tracing software in order to ensure the correct refraction simulation and resulting ray trajectories. The separate sub-imagers are considered separately in the procedure 400, with the light wavelength distribution for the imager under consideration being selected at step 408.

Beginning at step 410, each of the selected ray tracing start points is considered in turn. The software program is used to trace a virtual light ray of the selected wavelength from the selected point on the screen through the projection optics to the plane of the imager (412). The emulation of ray trajectories by the ray-tracing software is accurate enough to also emulate optical aberrations which may result from the design of the projection optics. Therefore, the path of the virtual light ray represents the path light would take from the imager plane through the projection optics (including any optical aberrations) to the selected starting point at the plane of the screen, which is selected as the ideal pixel location on the screen. Thus, the ray-tracing endpoint on the imager plane is mapped (414) as the center location for the corresponding imager pixel. If all of the pixels for the imager under consideration have been mapped (416) then the procedure continues to step 420, described below. Otherwise the next screen pixel ray-tracing start point is selected (418) and the procedure returns to step 412.

After all of the pixel locations for an imager have been traced, the map of the compensated pixel geometry for the imager is complete (420). If the image projection system involves separate color imagers then the compensated pixel geometries must be mapped for each color imager, and if the procedure 400 has finished with all of the multiple imagers then that is determined at step 422. If not all of the imagers have been mapped the procedure returns to step 408, where the light wavelength for the next imager is selected for the ray-tracing procedure. When all of the multiple imagers have been mapped the procedure reaches step 424.

The mapped compensated pixel geometry for each imager, as determined through the ray-tracing procedure, can then be used to adjust the pixel locations or spacings in an imager design for fabrication of the imager custom suited to the application defined at steps 402 and 404. Although in the above description of the process 400 the ray-trace starting points mentioned were the center points of the ideal pixel positions at the display screen, it will be appreciated that different sets of starting points could also be used. For example, more than one point for each pixel, or a certain set of pixels could be used as ray-trace starting points, which could be advantageous in some circumstances. If multiple starting points for a pixel were used for ray tracing, then it is possible that, on the basis of the optical aberrations, the shape of the pixel at the imager could be customized as well as altering the position of the pixel center in order to obtain the best compensation for the aberrations of the projection optics. Furthermore, in circumstances where some foreknowledge of optical aberrations in a given system is available, then those pixels which are known to not suffer from severe aberration affects could be neglected in the ray-tracing process. For example because optical aberration effects generally occur most severely near the edges of an image, it may be desirable in some instances to only ray-trace and compensate the geometry of those pixels of the imager which are greater than a minimum distance from the center of the imager array. Alternatively, some knowledge gained from actual experience with a projection system of the same or similar characteristics could lead to a more efficient selection of ray-trace starting points, or to the interpolation of pixel locations between those actually ray-traced, as will be readily apparent to those of ordinary skill in the art.

Experience has shown that lenses produced by modern optical manufacturing processes can be extremely consistent from part to part, and their performance can be accurately predicted by optical ray tracing methods during the lens design. It is therefore possible to accurately determine compensated pixel geometries during the design of the projection optics, before optics are built or tested, and to have a high level of confidence in the quality of images that will be produced by real systems. This approach can result in significant time and cost savings in a product development schedule.

Embodiments of this invention enable multiple geometric defects to be corrected simultaneously. As an example, radial distortion and lateral chromatic aberration are corrected simultaneously in a multiple-imager system. The previously described ray trace method determines the correct compensated pixel geometries when multiple aberrations are present in the imaging optics. Certain other aberration types, such as the chromatic variation of distortion, are also corrected when the ray trace method is used to determine compensated pixel geometries for each of the imagers in a multiple imager system.

Figure 5:
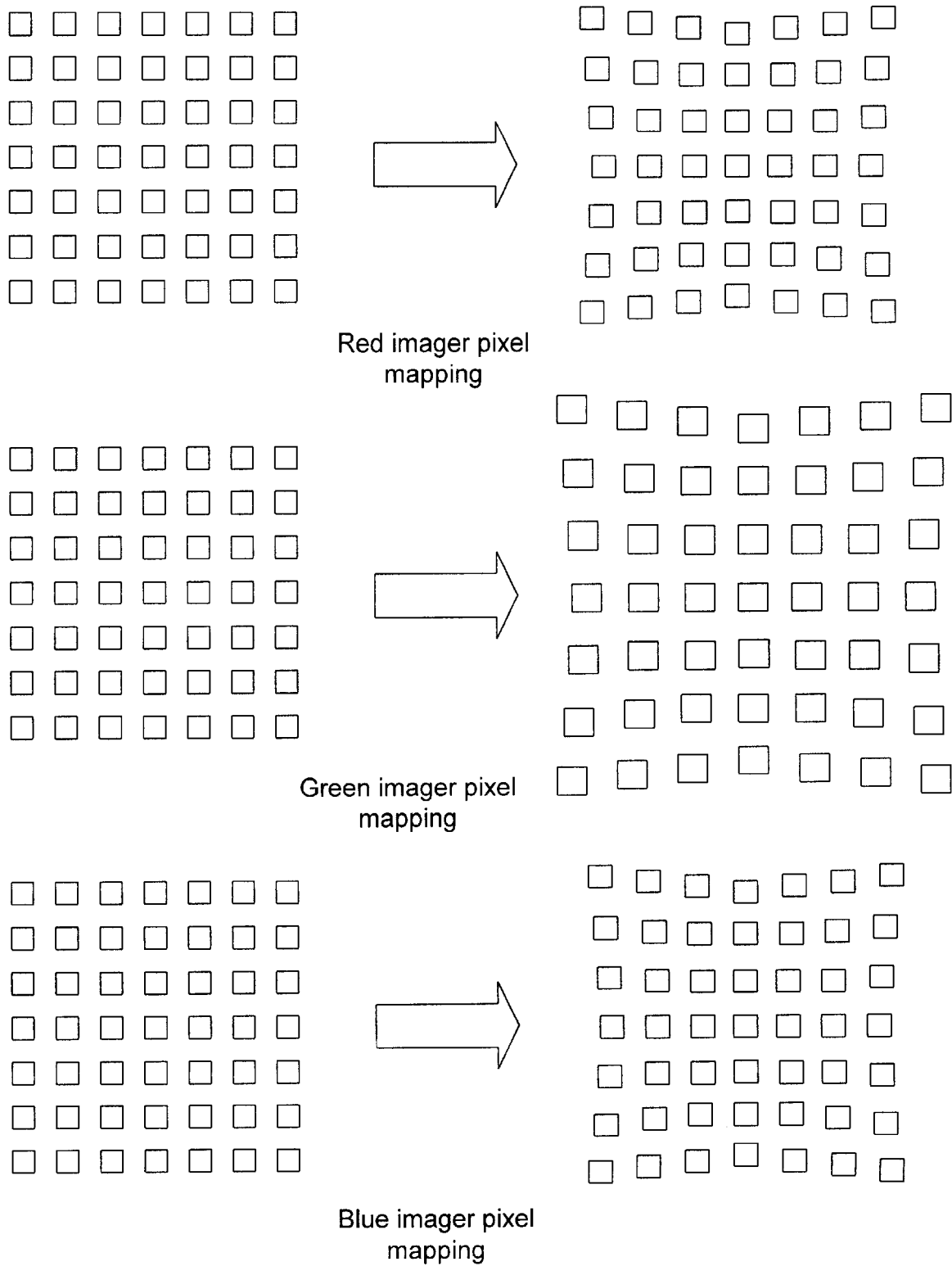
FIG. 5 is a diagrammatic illustration of imager pixel mapping according to an embodiment of the invention.

FIG. 5 is a simple diagrammatic illustration of imager pixel mapping based on the principles of the present invention. On the left-hand side of this figure are illustrated three uniform grid arrays representing ideal pixel geometries for respective red, green and blue imagers for an RGB projection system. On the right-hand side of the figure are shown compensated pixel geometries for the three color imagers, determined by a process as described above so as to result in an ideal pixel geometry on the projection screen.

Photolithographic processes impose certain limitations on the compensated pixel geometries that can be manufactured, but steps can be taken to minimize the effects of some of those limitations. One important limitation is the grid spacing used to define pixels and other features on the imager. Current photolithography technology commonly uses a 0.02 micrometer grid spacing. Since current pixel dimensions are typically 8.0 to 15.0 micrometers, the grid spacing might not appear to be a problem until an example is considered. Suppose that a certain projection optics design produces ½ pixel of red-green color shift in the horizontal direction at the edges of the image due to lateral chromatic aberration. Further suppose that the pixel size at the imager is 10 micrometers, and the imager is 1000 pixels wide. An attempt to correct this lateral color shift by making every pixel on one of the imagers wider by the minimum grid spacing of 0.02 micrometers would produce a 10 micrometer correction at the edge when only a 5 micrometer correction was desired. According to one embodiment of the present invention, this overcorrection is remedied by increasing the width of alternate pixels rather than every pixel. In general, errors which would require a grid spacing smaller than the minimum available, can be corrected by applying the correction to selected pixels only, rather than to all pixels.

Advantages of Embodiments of the Invention

In prior art, efforts to remove geometric errors from the projected image were directed at reducing residual lateral chromatic aberration and radial distortion in the projection optics to very small values. The uncorrected residual aberrations may be unacceptable despite the designer's best efforts, thereby limiting the quality of the projected images. The present invention can be used to compensate and effectively eliminate the residual aberrations in such a "best effort" design. Alternatively, embodiments of the invention enable the optical designer to achieve better correction of certain geometric aberrations while relaxing certain constraints on the design of the projection optics. For example, since lateral chromatic aberration and radial distortion no longer need to be well-corrected in the design of the projection optics, unused degrees of freedom are made available to the designer for potential use in achieving better correction of other aberrations.

Cost reductions may be achievable by designing the projection optics to reduced standards for lateral chromatic aberration and distortion. By shifting the burden of aberration correction to the imager geometry, it may be possible to simplify the design of the projection optics such that fewer elements, fewer glass types and less expensive glass types are required. The cost savings from these design simplifications is likely to exceed any added costs due to compensating the pixel geometry of the imagers.

In prior art, the design of advanced optical projection displays with large screens, thin enclosures, and high-resolution images, was limited by the difficulty of designing projection optics with acceptable cost and optical performance. Embodiments of this invention enable optical projection designs which were impractical in the prior art. More challenging optical designs become possible, systems that could not be built at any price become practical, and products that would have been prohibitively expensive using prior art become affordable.

The methods and systems of this invention, while described in the context of optical projection systems, are also applicable to optical image acquisition systems such as CCD or CMOS image sensor cameras, digital photographic systems, video cameras, film and document scanners, and the like. For example, a color camera using three CCD imagers can be corrected for lateral chromatic aberration and radial distortion in its objective lens by constructing the imagers according to compensated pixel geometries of this invention. Since light now passes from the object through the objective lens to the imagers, rather than in the opposite direction as in projection systems, the ray tracing used to determine the compensated pixel geometry is done without reversing the ray paths. An ideal pixel geometry of the appropriate size is defined at an object plane, and rays are traced from that ideal object to the imager. The image of the ideal pixel geometry thus produced at each imager is a compensated pixel geometry. Imagers constructed according to those compensated pixel geometries will produce images that are free from lateral chromatic aberration, distortion, and other geometric errors introduced by the objective lens. Wherein the geometry of the imagers is modified to compensate for the geometric errors introduced by the imaging optics so that the acquired image is substantially free from geometric errors.

Because the principles of the invention are applicable to optical image acquisition systems as well as optical image projection systems, it will be appreciated that where an imaging system is referred to generally to this specification and the appended claims both image acquisition and image projection are encompassed. Similarly, where reference is made generally to an imager, it is to be understood that the term is to encompass both pixelated image image-forming devices for projection systems and image sensing devices for acquisition systems. Furthermore, while the two-dimensional pixel arrays described herein have been Cartesian based arrays of rows and columns, other forms of pixel arrays are of course possible and are also applicable to the principles of the present invention.

The foregoing detailed description of the present invention has been presented by way of example only, and it is contemplated that changes and modifications may be made by one of ordinary skill in the art, to the materials and arrangements of elements of the present invention without departing from the scope of the invention. For example, while the invention has been described by way of examples using one imager or three imagers, it is generally applicable to systems with other numbers of imagers. Also, various specific items of equipment are described as suitable for use in the preferred embodiment, but of course other apparatus may equally be used and may be functionally equivalent for the purposes of carrying out the present invention

We claim:

1. An optical imaging system having an imager arranged for processing of imaging light from a light source, to an imaging optics device having at least one lens or concave mirror, the imager including an array of pixels in which the pixel geometry is arranged to compensate for aberration in the imaging optics to thereby provide corrected imaging.

2. An optical imaging system as claimed in claim 1, including a plurality of imagers which project or receive light of respective different colors through the same imaging optics device.

3. An optical imaging system as claimed in claim 2, wherein each of the imagers has a non-uniform pixel geometry which is arranged to compensate for at least one of radial distortion and keystone distortion aberrations.

4. An optical imaging system as claimed in claim 2, wherein the non-uniform pixel geometries of the imagers are arranged differently from each other to compensate for lateral chromatic aberration.

5. An optical imaging system as claimed in claim 3, wherein the non-uniform pixel geometries of the imagers are arranged differently from each other to compensate for lateral chromatic aberration.

6. An optical imaging system as claimed in claim 1, wherein the optical imaging system is an image projection display device.

7. An optical imaging system as claimed in claim 6 including a plurality of imagers in the form of image-forming devices, wherein a first imager produces a first image field in a first wavelength range and a second imager produces a second image field in a second wavelength range, the first imager having a different non-uniform pixel geometry than the second imager.

8. An optical imaging system as claimed in claim 7, further including a third imager which produces a third image field in a third wavelength range.

9. An optical imaging system as claimed in claim 8, the third imager having the same non-uniform pixel geometry as the first imager.

10. An optical imaging system as claimed in claim 1 including a plurality of imagers in the form of image-sensing devices, wherein a first imager is reactive to imaging light of a first image field in a first wavelength range and a second imager is reactive to imaging light of a second image field in a second wavelength range, the first imager having a different non-uniform pixel geometry than the second imager.

11. An optical imaging system as claimed in claim 10, further including a third imager which is reactive to imaging light of a third image field in a third wavelength range.

12. An optical imaging system as claimed in claim 11, the third imager having the same non-uniform pixel geometry as the first imager.

13. An imager for processing light in conjunction with imaging optics, the imager having a two-dimensional array of light-producing, light modifying or light-sensing pixels, wherein the array has a non-uniform geometry with the pixels arranged to compensate for an optical aberration of the imaging optics.

14. A pixelated imager as claimed in claim 13 wherein the non-uniform geometry of the pixel array comprises a difference in adjacent pixel spacing, the difference in pixel spacing being an integral number of photolithographic grid spacings.

15. A method for producing an imager for an image forming or image acquisition system which processes imaging light from a light source by respectively projecting or receiving through an imaging optics device, comprising the steps of:

selecting an optical imaging system configuration for use with an imager;

selecting or designing imaging optics for use with the imager in the selected configuration;

selecting a set of start points;

mapping a set of end points on the imager corresponding to images of the start points formed by said imaging optics;

designing a non-uniform pixel geometry for the imager using the mapping of said start points to said end points; and producing an imager having said non-uniform pixel geometry.

16. A method as claimed in claim 15, wherein the mapping of said end points from said start points is accomplished by computerized ray tracing.

17. A method as claimed in claim 15, wherein the optical imaging system configuration further utilizes an image projection display having a projection screen, and wherein the selection of selected set of start points corresponds to a set of points on said projection screen.

18. A method as claimed in claim 17, wherein the mapping of the set of end points corresponds to a set of points in the plane of the imager, as traced from the selected set of start points on said projection screen, in use in the selected optical imaging system configuration.

19. A method as claimed in claim 18, wherein the mapping of said end points from said start points is accomplished by computerized ray tracing.

20. A method as claimed in claim 18, wherein said selection of the set of start points represents a set of desired pixel projection locations on said projection screen, and wherein said mapping of the set of end points represents said non-uniform pixel geometry for the imager, wherein said non-uniform pixel geometry is arranged to compensate for aberration in said imaging optics.

* * * * *